United States Patent [19]

Huang

[11] Patent Number: 4,583,724

[45] Date of Patent: Apr. 22, 1986

[54] MULTIPLE-PURPOSE VICE FOR WOOD WORKING

[76] Inventor: Charles Huang, P.O. Box 10160, Taipei, Taiwan

[21] Appl. No.: 748,674

[22] Filed: Jun. 25, 1985

[51] Int. Cl.$^4$ .................................................. B23Q 1/04

[52] U.S. Cl. .......................................... 269/88; 269/98; 269/182; 269/253; 269/261; 269/283

[58] Field of Search .................. 269/181, 182, 88, 253, 269/266, 261, 283, 97, 98

[56] References Cited

U.S. PATENT DOCUMENTS

| | | | |
|---|---|---|---|
| 825,151 | 7/1906 | McLear | 269/181 |
| 2,881,645 | 4/1959 | Kruchten | 269/182 |
| 2,990,738 | 7/1961 | Zysset | 269/253 |
| 4,306,709 | 12/1981 | Hurn | 269/283 |
| 4,341,375 | 7/1982 | Romanin | 269/253 |
| 4,509,731 | 4/1985 | Schaal et al. | 269/261 |

*Primary Examiner*—Robert C. Watson

[57] ABSTRACT

A multiple-purpose vice for wood working includes a lead screw and two guide bars slidingly defined by two bench clamps on a bench, two center-rest clamping jaws mounted on two jaw bases slidingly inserted with the lead screw and the two guide bars for clamping flat-surface work piece, two universal clamping jaws rotatably mounted on the jaw bases for clamping irregular-shaped work piece and an outside-span clamping base clamped on the bench beyond the span between the two bench clamps for clamping larger work piece not allowed to be clamped within the span of two bench clamps.

3 Claims, 7 Drawing Figures

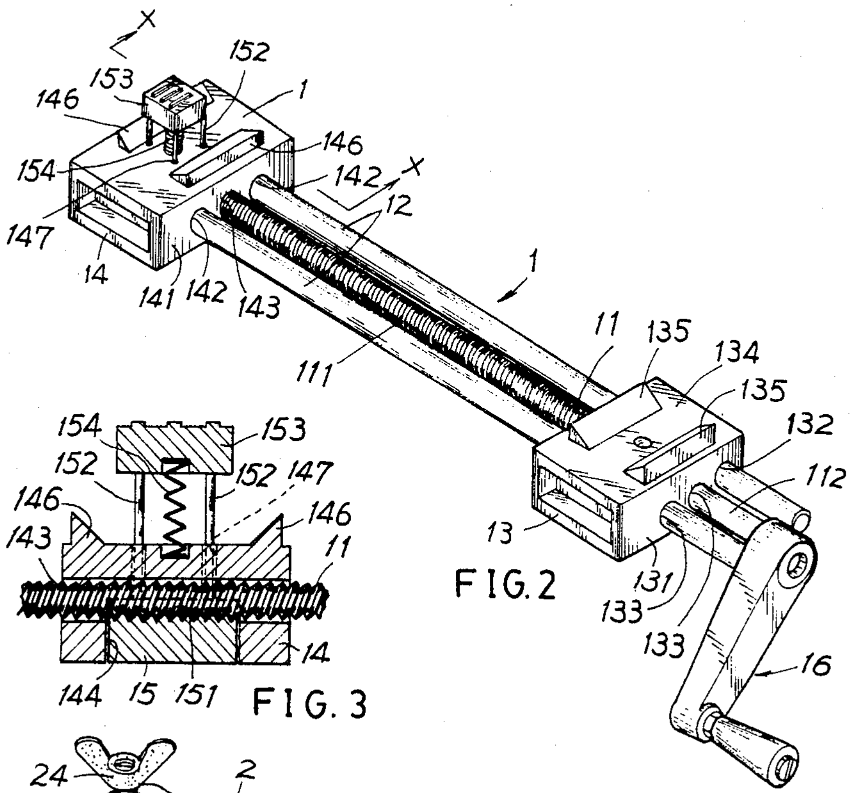
FIG. 2
FIG. 3
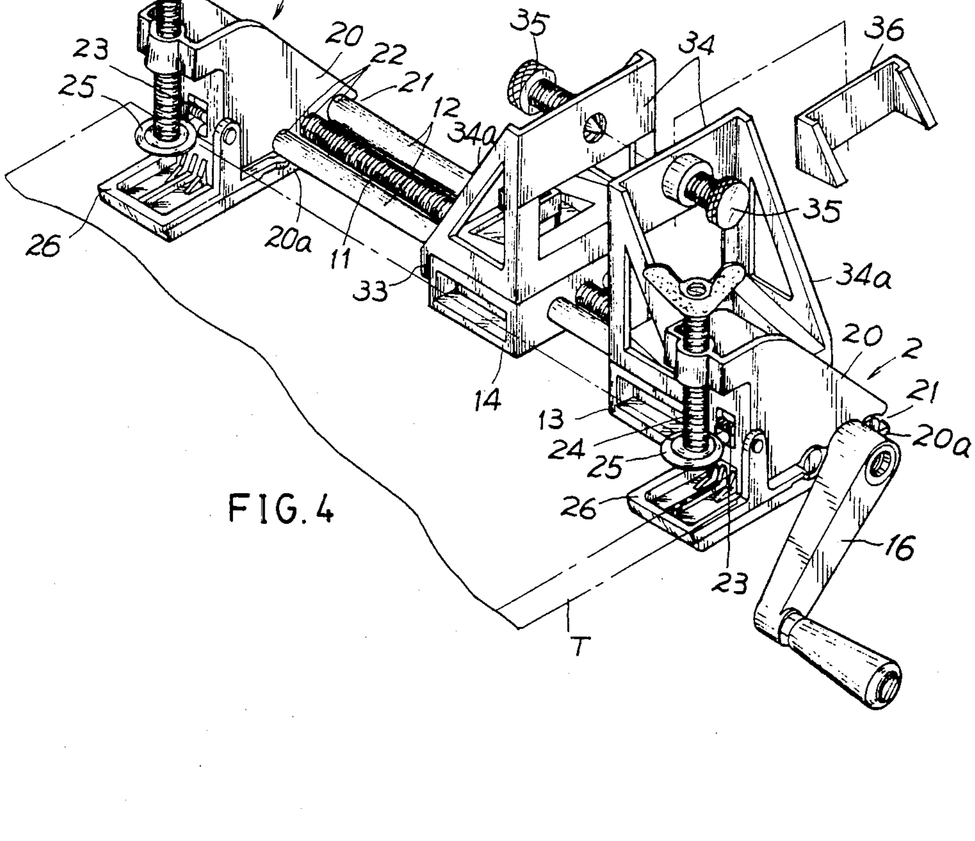
FIG. 4

MULTIPLE-PURPOSE VICE FOR WOOD WORKING

BACKGROUND OF THE INVENTION

Conventional vice suitable for wood working is formed as single function, fixed type and clumsy structure so that it is lacking of handling convenience and operative brightness. Whenever used for clamping irregular or larger work piece, such a conventional vice can not be operated efficiently or satisfactorily. For example, in order to process several work pieces including flat surface and irregular shape, there may be provided with at least two types or models of vices to process the flat-surface work piece and irregular work piece respectively. It is therefore uneconomic and inconvenient in wood working processing by utilizing such a conventional vice.

The present inventor has found the defects of conventional vice and invented the present multiple-purpose vice for wood working.

SUMMARY OF THE INVENTION

The object of the present invention is to provide a vice suitable for wood working, which includes a guide means, a pair of bench clamps, a pair of center-rest clamping jaws, and a pair of universal clamping jaws wherein such pair of center-rest clamping jaws can be used to clamp a working piece having flat surface or to clamp a piece whose central line is to be aligned for processing necessity, and wherein such pair of center-rest clamping jaws can be substituted with a pair of universal clamping jaws for clamping the work piece irregularly shaped.

Another object of the present invention is to provide a vice comprising an outside-span clamping base which can be fixed on a bench beyond the span limit between the two bench clamps and can be mounted thereon with a clamping jaw so as to clamp a larger work piece beyond the jaw span with another clamping jaw originally mounted on the guide means.

BRIEF DESCRIPTION OF THE DRAWINGS

FIG. 2 is a perspective drawing of the guide means of the present invention.

FIG. 3 is a partial sectional drawing of the guide means taken from X—X direction of FIG. 1 of the present invention.

FIG. 4 is an illustration showing the center-rest clamping jaws mounted on the present invention.

DETAILED DESCRIPTION

Figure 1:
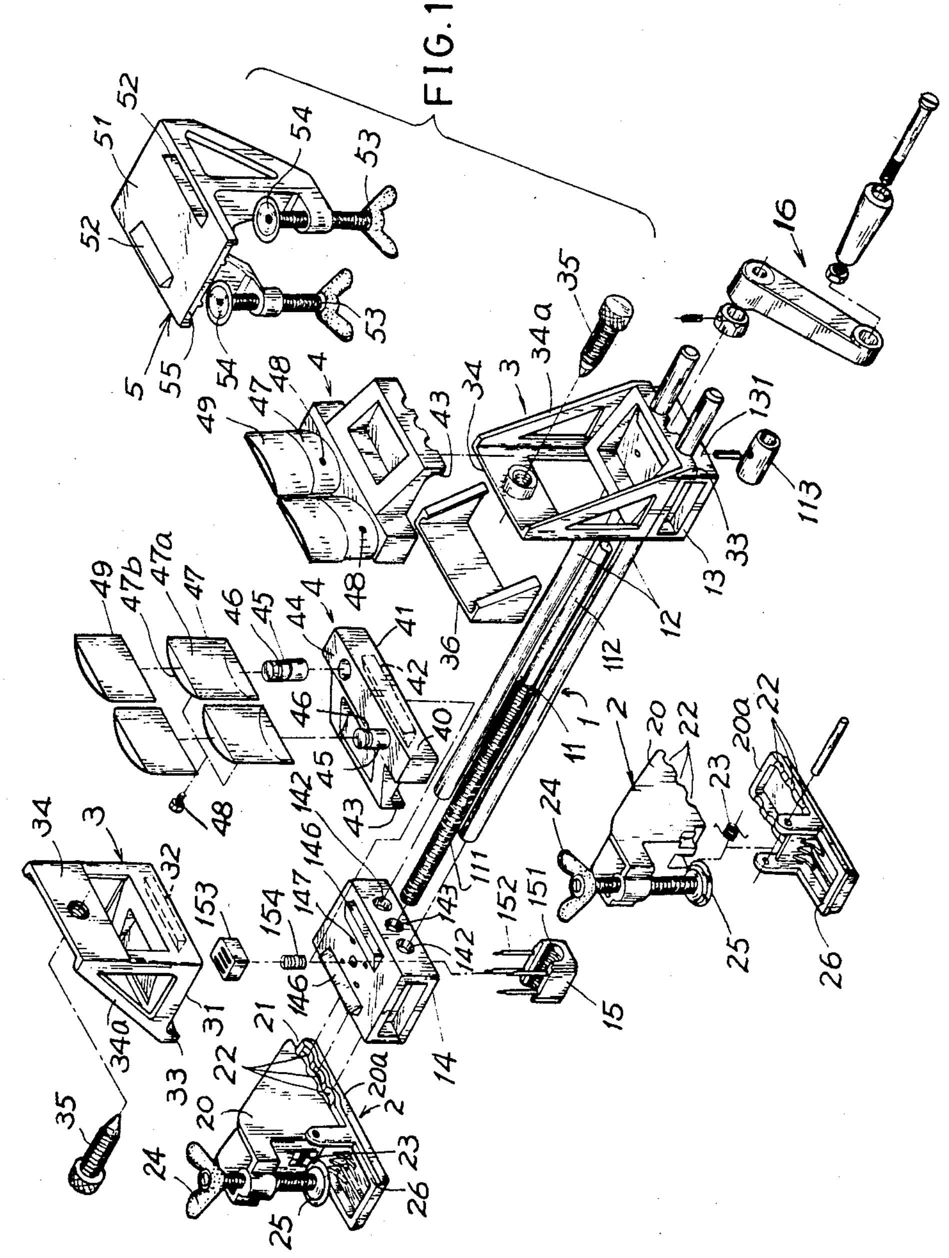
FIG. 1 is an illustration showing all parts constructing the present invention.

As shown in the figures, the present invention comprises a guide means 1, a pair of bench clamps 2, a pair of center-rest clamping jaws 3, a pair of universal clamping jaws 4 and an outside-span clamping base 5.

The guide means 1 comprises a lead screw 11, two slide bars 12 parallel to lead screw 11, a fixing jaw base 13, a sliding jaw base 14, a fast-moving span adjuster 15 and a driving handle 16. Lead screw 11 is formed with male-threaded portion 111 from its one end and formed with a shaft portion 112 on its opposite end. Fixing jaw base 13 is formed with three holes, of which two side holes 132 are slidingly inserted with two slide bars 12 and the central hole 133 is jacketed with a jacket tube 113 which is rotatably inserted with the shaft 112. Two engaging extensions 135 are parallelly formed on the top surface 134 of fixing jaw base 13.

Sliding jaw base 14 is formed with three holes, of which the two side holes 142 are slidingly inserted with two slide bars 12 and the central hole 143 is movably inserted with the lead screw 11. The sliding jaw base 14 is formed with a rectangular recess 144 in its bottom portion, the recess 144 poking a depth to a level involving the center line of the central hole 143. The top surface 145 of jaw base 14 is also formed with two engaging extensions 146 corresponding to the two extensions 135 formed on base 13.

The fast-moving span adjuster 15 is movably engaged with the rectangular hole 144 in the jaw base 14 and is formed with a transverse female-threaded groove 151 of semi-circle shape to engage with the male-threaded portion 111 of lead screw 11. The fast-moving span adjuster 15 is upperly formed with four guiding rods 152 slidingly moved within four guide holes 147 formed on sliding jaw base 14. The guiding rods 152 are commonly connected with a button cap 153 on their uppermost ends. A restoring spring 154 is provided under the button cup 153 bearing against the upper surface 145 of base 14 so as to normally raise the span adjuster 15 to allow its female-threaded groove 151 engaged wth the male-threaded portion 111 of lead screw 11 which is driven by a handle 16 terminated on the protruding end of lead screw 11 so as to adjust the clamping span between the sliding jaw base 14 and the fixing jaw base 13.

Each of the two bench clamps 2 comprises two chucks having three arcuated grooves 22 formed in the clamping mouth 21 between the two chucks 20, **20*a* to resiliently clamp the two guide bars 12 and rotatably dispose the lead screw 11 as acted by a torsional spring 23. The clamp 2 is also formed with a wing bolt 24 having a lower disc 25 and a clamping plate 26** to be tightly clamped on a bench T.

Each of the center-rest clamping jaws 3 is formed with two engaging grooves 32 engageable with the two extensions 135 or 146 respectively formed on base 13 or base 14, and formed with a side extension edge 33 to be stably fitted on either base 13 or 14. A tail spindle 35 is formed on the upper frame portion **34*a* of jaw 3 to clamp a work piece whose center line can be aligned with the center line of the tail spindle 35. Such an upper frame portion 34*a* includes a flat vertical surface 34 for clamping a work piece having flat surface or regular shape as tightened by the tail spindle 35. A soft jacket 36 can be jacketed on the frame portion 34*a*** to prevent scratching of the surface of a work piece.

Each of the two universal clamping jaws 4 comprises a holder 40 having two engaging grooves 42 on its bottom 41 engageable with the two extensions 135 or 146 of base 13 or base 14 and having a side extension edge 43 to be stably fitted on either base 13 or 14, two cylindrical columns 45 formed on the upper surface 44 and each formed a ring groove 46 thereon, and two semi-circle clamping blocks 47 each rotatably mounted on each column 45 by a screw 48 rotatably engaged with groove 46. Each block 47 may be jacketed by a soft jacket 49 thereon for scratching prevention. Such a semi-circle clamping block 47 is beneficial to clamp regular or flat work piece by its flat surface 47*a* and to clamp irregular work piece by its arcuated surface 47*b* by adjusting the rotating degree of the block 47 around the axis of column 45.

Figure 7:
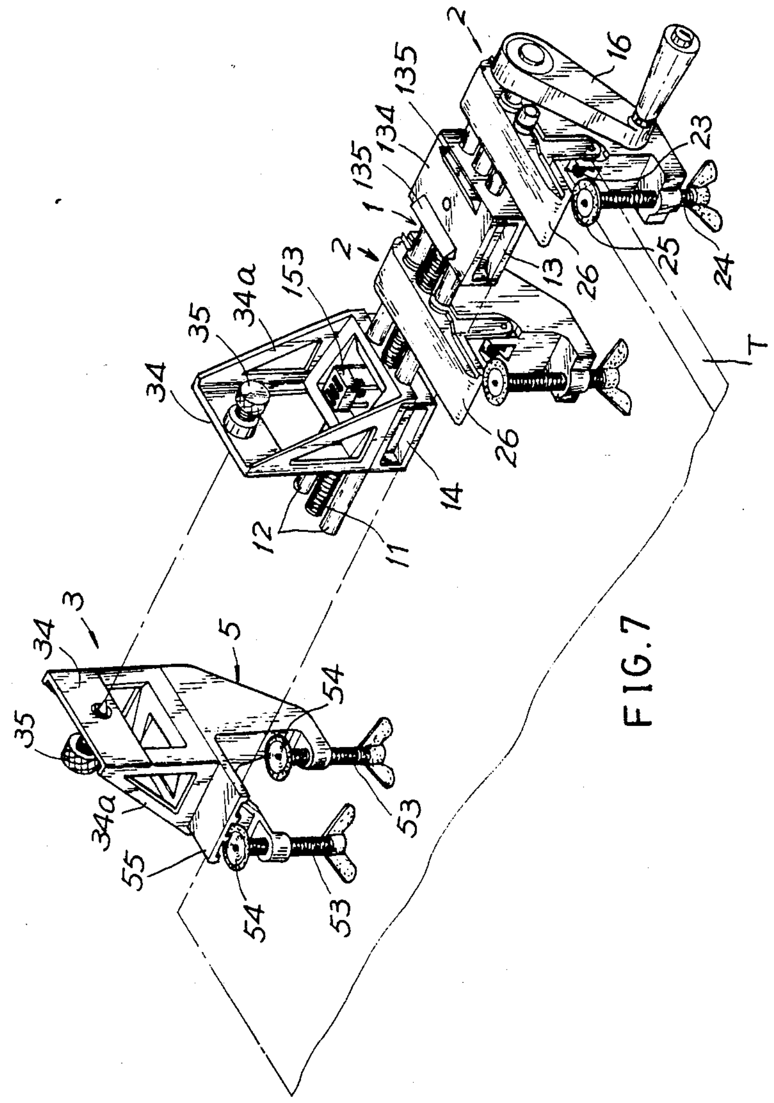
FIG. 7 shows the application of the outside-span clamping base in the present invention.

Outside-span clamping base 5 comprises two engaging extensions 52 formed on its upper surface 51 engageable with either center-rest clamping jaw 3 or universal clamping jaw 4, two wing bolts 53 rotatably formed on the base 5 and each having a clamping disc 54, and a clamping plate 55 extending from the upper surface and adapted to clamp the base 5 on a bench T by fastening the two wing bolts 53. When processing a larger work piece unable to be clamped within the two bench clamps 2, the outside-span clamping base 5 is clamped on the bench beyond the bench clamp 2 and jaw 3 is mounted on the base 5. A bench clamp 2 is removed to be clamped inside the sliding base 14 as shown in FIG. 7 and another jaw 3 is mounted on the base 14 to allow its flat surface 34 facing the surface 34 of the jaw 3 mounted on the outside-span clamping base 5.

When using the present invention to clamp the flat-surface work piece as shown in FIG. 3, the center-rest clamping jaws 3 are mounted on the two bases 13, 14. The button cap 153 of the span adjuster 15 is depressed to lower the adjuster and release the engagement of female-threaded groove 151 from the male-threaded portion 111 of lead screw 11 to fastly move the base 14 to the clamping position touching the work piece. The handle 16 is then rotated to drive the lead screw 11 engaged with the span adjuster 15 and in turn drive the base 14 and jaw 3 to tightly clamp the work piece.

Figure 5:
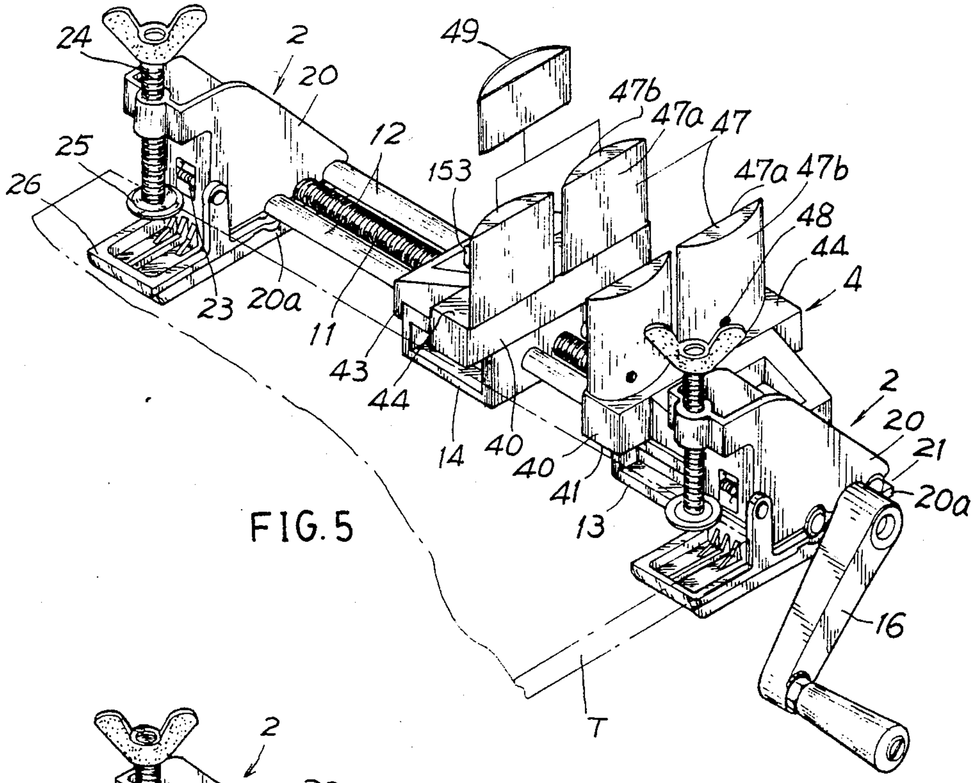
FIG. 5 is an illustration showing the universal clamping jaws mounted on the present invention.
Figure 6:
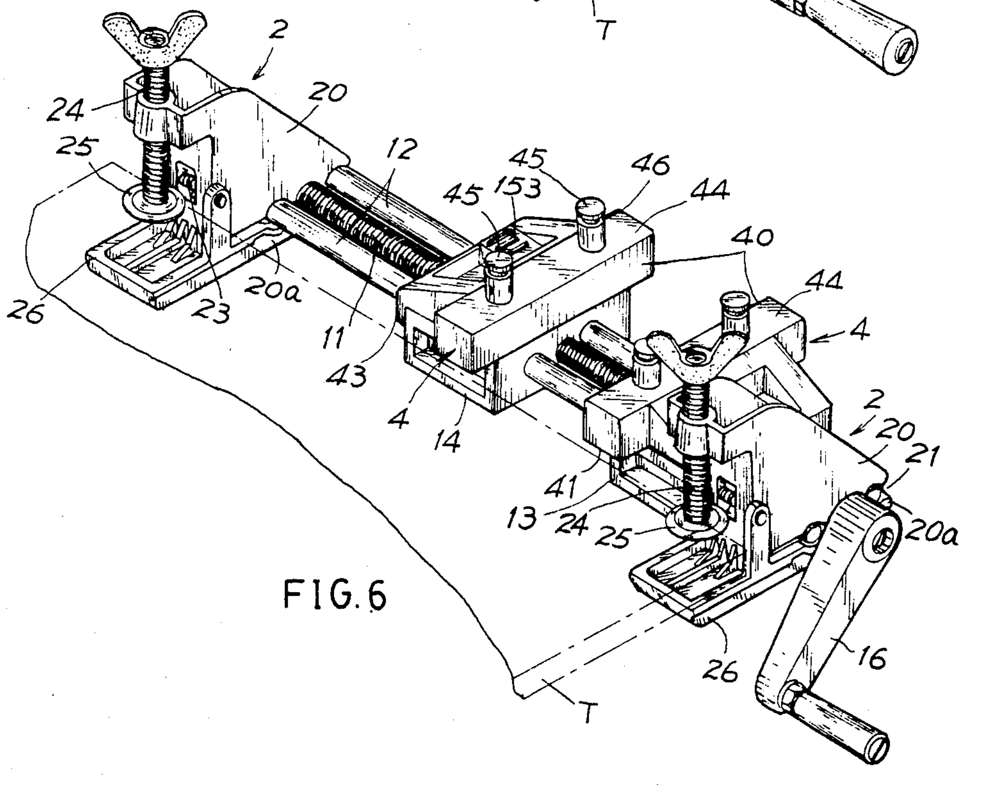
FIG. 6 shows the clamping cylindrical columns mounted on the guide means of the present invention.

For clamping irregular work piece, the universal clamping jaws 4 can be used to replace the center-rested clamping jaws 3 as shown in FIG. 5, in which the universal clamping blocks 47 are rotated around the columns 45 adapted to the specific irregular shape of the clamped work piece. The universal blocks 47 can be removed to reveal the clamping cylindrical columns 45 for clamping shorter work piece as shown in FIG. 6.

The present invention has the following advantages superior to prior vices:

1. The two bases 13, 14 can be optionally mounted with either center-rest clamping jaws 3, or universal jaws 4 for diversified clamping purposes. The base 5 may serve to clamp special large piece to furnish the multiple purposes of this invention.

2. All elements can be easily dismantled, removed, interchanged or assembled and is thus helpful for convenient operation, storage and handling.

I claim:

1. A multiple-purpose vice for wood working comprising: a guide means including a lead screw having a male-threaded portion and a shaft portion, two guide bars parallel to said lead screw, a fixing jaw base having two engaging extensions thereon and slidingly inserted with said two guide bars and said shaft portion of said lead screw, a sliding jaw base having two engaging extensions thereon corresponding to the two engaging extensions of said fixing jaw base and slidingly inserted with said two guide bars and the male-threaded portion of said lead screw, and a fast-moving span adjuster engaged within a rectangular hole formed under said sliding jaw base and movably engaged with said lead screw as driven by a handle terminated on said lead screw;

a pair of bench clamps including two clamping chucks having three holes in a clamping mouth between the two chucks to resiliently clamp said two guide bars and rotatably insert said lead screw as acted by a torsional spring fixed therein, a wing bolt and a clamping plate adapted to fasten said bench clamp on a bench;

two center-rest clamping jaws including an upper frame portion having a flat surface adapted to clamp the flat-surface work piece, a tail spindle rotatably fixed on said upper frame portion to fasten the work piece especially for the piece to be aligned with the center line of said spindle, two engaging grooves formed on its bottom engageable with said two engaging extensions formed on either sliding jaw base or fixing jaw base and a side extension edge adapted to stably fix said jaw on either said base; two universal clamping jaws including a holder having two engaging grooves on its bottom engageable with said two engaging extensions on said base and having a side extension adapted to stably mount said jaw on said base, two clamping cylindrical columns fixed on said holder and two semi-circle universal clamping blocks rotatably mounted on said two columns to allow each block rotated around the axis of said column adapted to clamp irregular work piece; and an outside-span clamping base having two engaging extensions on its upper surface engageable with the two engaging grooves formed on the bottom of said jaw and having two wing bolts each formed with a clamping disc adapted to clamp said base on a bench with a clamping plate extending from said upper surface, whereby a larger work piece can be clamped between a jaw mounted on said outside-span base and another jaw mounted on a sliding jaw base beyond said bench clamp.

2. A vice according to claim 1, wherein said fast-moving span adjuster is engaged with a rectangular hole on the bottom of said sliding jaw base, said span adjuster being formed with a female-threaded groove with semi-circle shape engaged with the male-threaded portion of said lead screw and formed with four guiding rods passing through said sliding base and upperly fixed with a button cap, under said cap a restoring spring retained to bear against the upper surface of said sliding base so as to normally raise said adjuster to engage female-threaded groove with the male-threaded portion of said lead screw for driving said base, said adjuster and said jaw for clamping operation, whereby said button cap can be depressed to lower said span adjuster to release the engagement with said lead screw for fast span adjustment.

3. A vice according to claim 1, wherein each said jaw is jacketed with a soft jacket to prevent scratching of the clamped work piece.

* * * * *